Sept. 9, 1969    R. J. FISHAW    3,465,507
FLAIL KNIFE ASSEMBLY
Filed Feb. 23, 1967
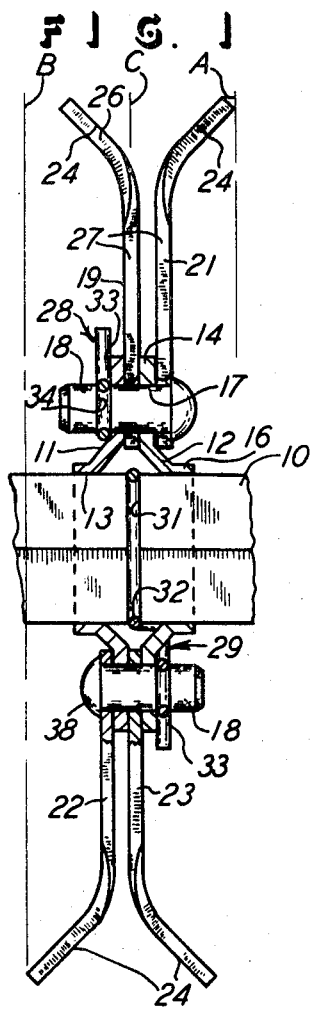
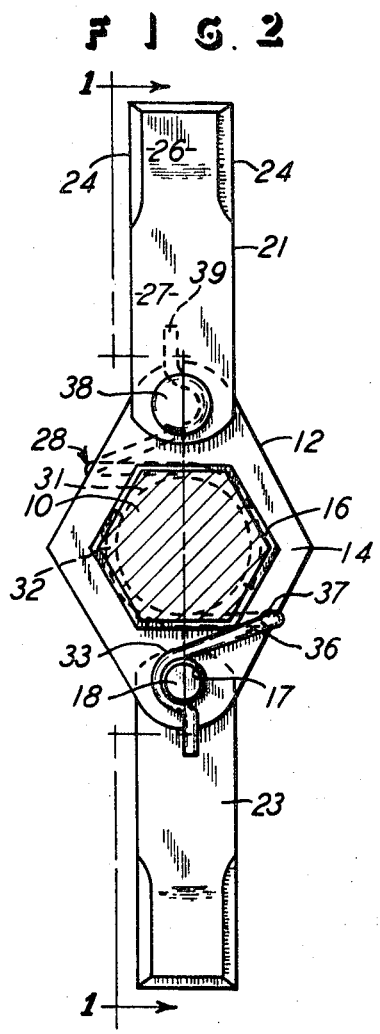
INVENTOR:
RAYMOND J. FISHAW
BY: *Arthur J. Hansmann*
ATTORNEY

United States Patent Office 3,465,507
Patented Sept. 9, 1969

3,465,507
FLAIL KNIFE ASSEMBLY
Raymond J. Fishaw, Racine, Wis., assignor to Jacobsen
  Manufacturing Company, Racine, Wis., a corporation
  of Wisconsin
Filed Feb. 23, 1967, Ser. No. 617,970
Int. Cl. A01d 55/20
U.S. Cl. 56—294                                          5 Claims

ABSTRACT OF THE DISCLOSURE

A flail knife assembly for use in crop cutting and having a rotatable shaft supporting knife holders therealong. Knives are pivotally attached to the holders to be pivoted radially outwardly under centrifugal force of rotation, and to be retractable when debris is struck by the knife. Spring clips are used for releasably securing the knives to the holders through the means of pins.

BACKGROUND OF THE INVENTION

This invention relates to a flail knife assembly of the type used for cutting vegetation, crops, or the like.

The prior art is already aware of constructions for flail knives which are pivotally mounted on horizontally rotating shafts to be radially extendable from the shaft, and to be retractable when the knives abut debris. The knives are subjected to high rotational speeds, and they are also subjected to the prospects of being damaged in striking debris, since they are commonly used in areas where the ground may not be cleared of sticks and stones or the like. Under high rotational speeds, the centrifugal force can be sufficient to distort the knives from their desired original shape. Also, the knives can be distorted and certainly can be dulled by striking debris which may be on the ground.

Still further, the prior art is aware of flail knife assemblies wherein the knives can be replaced when they are damaged. Commonly, structural provisions are made for replacement of the individual knives in the assembly which may contain a large plurality of knives.

However, prior art structures are inherently susceptible to distortion due to high rotational speeds which create substantial centrifugal forces acting on the blades or knives to actually cause them to distort by tending to straighten themselves. Also, the prior art assemblies are more susceptible to damage caused by the knife striking debris, and the knife holders are not arranged to be capable of withstanding both the centrifugal force and the impact of the blade or knife striking debris, and the assembly therefore soon becomes loose from wear.

While the prior art recognizes the desirability of utilizing springs for removably retaining the knives in the assembly, nevertheless the springs are arranged so that they may themselves become loose or disconnected when subjected to top speeds of flail knife operation. One example of the prior art assembly is in U.S. Patent 3,222,854 which shows an assembly having certain advantages over the art developed prior to the time of that invention, but which also shows certain knife mounting and knife shapes which are different from the disclosure in the present invention.

The present assembly is particularly suitable for high-speed rotation, and it is found to be durable and resistant to breakage and bending.

BRIEF DESCRIPTION OF THE DRAWING

FIG. 1 is a side elevational view of an embodiment of this invention, and with the view being partly in section, and taken substantially along the line 1—1 of FIG. 2.
FIG. 2 is an end elevational view of FIG. 1.

DESCRIPTION OF THE PREFERRED EMBODIMENT

The flail knife assembly of this invention is known to be commonly supported in a mowing or cutting machine which is suitably supported on the ground and which has a prime mover for operation of the cutter assembly. Thus a mounting shaft 10 is incorporated as a part of the machine and is horizontally disposed as shown in the drawing. The shaft 10 is commonly rotated at a high speed, and it is shown to be hexagonally shaped and of course only a fragment of the shaft 10 is shown, it being understood that it would extend for a suitable length and a number of the assemblies mounted thereon as shown in FIG. 1 would be mounted along the shaft 10, as desired.

A pair of knife holders 11 and 12 are provided with hexagonal openings 13 so that they can be snugly assembled on the shaft 10 and are movable axially therealong. The holders 11 and 12 have plate portions 14 extending around the shaft 10, and they also have flanges 16 extending around the shaft 10 and somewhat therealong for lateral stability of the holders 11 and 12 on the shaft 10. The plate or peripherally extending portions 14 have openings 17 extending therethrough, and the openings 17 are aligned between the holders 11 and 12 for reception of pins 18. The pins 18 are snugly received in the openings 17, and they are removable therefrom. Also, knives 19 and 21 are pivotally mounted on the upper pin 18, while knives 22 and 23 are pivotally mounted on the lower pin 18. The knives are therefore radially extendable under centrifugal force to pivot outwardly, as shown in their positions in FIG. 1, when the shaft 10 is rotated to rotate the entire assembly shown in FIG. 1. The knives have cutting edges 24 disposed on their crop-cutting outer ends or portions designated 26, and these portions are shown to be disposed at 45 degrees with respect to the plane and location of the knife shank portions designated 27.

It will further be noted that the knives are staggered in their mounting on the two pins 18, so the knife cutting edges 24 are shaped and disposed to have the assembly shown in FIG. 1 cut a swath extending from the plane designated A on the extreme right end of the knife 21, to the plane designated B on the extreme left end of the knife 22. That is, the knife 22 will cut up to the plane B, which is to the left of the cut provided by the knife 19. Also, the knife 23 is disposed to cut up to a plane designated C, and it also cuts at a point overlapping with the cut of the knife 21.

Still further, the knife crop-cutting portions 26 are disposed at the angle shown and described, and such angle is one which will permit the assembly to be rotated at a high speed but yet the knife ends will not straighten when subjected to centrifugal force. For example, speeds of rotation may be ten to twelve thousand r.p.m., and this speed is recommended for good cutting, and the speed of the radial tips of the knives may then be sixteen to twenty thousand feet per minute. Under such high speeds, the knife is subjected to substantial centrifugal force, and it is therefore significant to have the knife shaped so that it will not distort, and so that it will function desirably when it is cutting as well as when it strikes a foreign object. It is of course expected that the knife will pivot out of the path of the foreign object, if such object is immovable.

It will be further noted that the knives are all interchangeable, and any one knife can occupy any one position. Still further, the knives are provided with a cutting edge 24 on each side thereof, so the knives can even be turned in their interchanged positions to give them double life. Of course removal of the pin 18 from the holders 11 and 12 will permit replacement of the knives.

The fact that there are four knives on each two knife holders 11 and 12 permit the advantages and arrangement mentioned. Of course additional assemblies would be mounted on the shaft 10 adjacent the assembly shown in FIG. 1, and these adjacent assemblies would cut up to the planes A and B to give complete cutting coverage for a complete swath for the length of the mounting shaft 10, in a manner well known in the art.

To secure the entire assembly as shown, and for the functions described, the two spring clips 28 and 29 are included in the assembly and extend between the mounting shaft 10 and the pins 18, respectively. Thus the shaft 10 has a groove 31 extending therearound, and the inner ends 32 of the springs 28 and 29 are disposed in the groove 31 to extend partly therearound, as shown in FIG. 2. The spring opposite ends 33 extend around a part of the pins 18 and in grooves 34 formed in the pins 18. Finally, the intermediate spring length 36, on each of the springs 28 and 29, complete the continuous length of the spring, and these intermediate lengths 36 are mounted on the holders 11 and 12 by being received in notches in the edges of the holder peripheral portions 14, such as the notch 37 shown in FIG. 2.

It will therefore be noted that the spring intermediate length 36 is secured to the holders 11 and 12, but is of course removable therefrom by moving out of the notches 37. Then the spring ends 32 and 33 extend between the shaft 10 and the respective ones of the pins 18, and they extend around the shaft 10 and the respective pins 18 in opposite directions from one axial view of the shaft 10, such as the view in FIG. 2. Thus, it will be understood that when the assembly is subjected to centrifugal force, if the spring end 32 would tend to move radially outwardly, this action would simply cause the spring end 33 to become more secure with the pin 18, and the assembly would therefore remain intact. Thus the springs are of course arranged to be active in a direction which would cause them to bear down on the respective pins 18, both under the common spring tension as well as under the centrifugal force described.

The springs 28 and 29 therefore secure the pins 18, and the pin heads 38 are available on one end of the pins 18 and the springs are available on the opposite ends to completely flank the holders and the knives. This therefore axially secures the holders 11 and 12 on the shaft 10, as well as having the springs 28 and 29 secure the pins 18 to the holders.

Thus only one shaft groove 31 need be provided for the entire assembly shown and described. Thus the holders 11 and 12 can extend axially along the shaft 10 in their flange portion 16, to be stable on the shaft 10 and to resist wear and not become loose on the shaft when subjected to the rigors of the operation of the assembly. Also, the springs 28 and 29 have ends 39 which project from the pins 18 to be available for manual removal of the springs 28 and 29 from the pins 18 for assembly or dissassembly of the knives, as desired. It has been found that even though the springs 28 and 29 are both disposed in the same groove 31, and thereby only one groove need be provided and the other parts are more readily accommodated in the nature mentioned, the greater the centrifugal force, the greater the holding ability of the springs 28 and 29.

While a specific embodiment of this invention has been shown and described, it should be obvious that certain changes could be made in the embodiment.

What is claimed is:

1. A flail knife assembly including a mounting shaft having a cross-sectional shape of angularly disposed sides, knife holders having openings with shapes of said angularly disposed sides snugly receiving said shaft and being removable from said shaft and having peripherally extending portions with pin openings therethrough, pins snugly removably disposed in said pin openings and each pin having a groove on an end thereof, knives pivotally mounted on said pins and being positionable to extend radially outwardly from said mounting shaft and having crop-cutting edges on the extending ends of said knives, spring means releasably attached to said holders and said pins by being partly disposed in said grooves for releasably securing said pins to said holders and rendering said knives replaceable upon removal of said pins and for axially locating said knife holders on said mounting shaft, wherein the improvement comprises said knife holders being arranged in pairs and each having two of said pin openings disposed in radially opposite locations on said peripherally extending portions, one of said pins disposed in each one of said two pin openings on each of said knife holders, a pair of said knives mounted on each one of said pins, said knives including shank portions and radially outwardly extending crop-cutting portions having said crop-cutting edges, with said shank portions being mounted on said knife holders in an arrangement wherein one of said pairs of said knives is mounted on the peripherally extending portion of one of said knife holders and is in contact with and on opposite sides thereof and the other of said pairs of said knives is mounted on the radially opposed peripherally extending portion of the other of said knife holders and is in contact with and on opposite sides thereof, said knives thus being staggered axially along said mounting shaft, said crop-cutting portions extending diagonally radially outwardly from said shank portions in opposite directions between said pairs of said knives and extending axially of said mounting shaft a distance sufficient to provide complete rotational coverage by the four of said crop-cutting edges between two planes transverse to said mounting shaft and located at the opposite axial extents of said four knives.

2. The subject matter of claim 1, wherein said shaft has a groove and said knife holders have notches in said peripherally extending portions, and wherein each of said spring means includes an intermediate length received in said notch of said knife holder and includes two opposite end portions formed to respectively nest in said shaft groove and said pin groove, both of said opposite end portions extending from said intermediate length and between said mounting shaft and respective ones of said pins and around in said respective shaft and pin grooves in opposite directions relative to one axial view of said mounting shaft for increasing spring tension on said pin when said spring is subjected to centrifugal force due to rotation of said assembly.

3. The subject matter of claim 1, wherein said shaft has a groove, said pairs of said knife holders have flanges extending away from each other and away from said groove and snugly along said mounting shaft to substantially the planes of the opposite end limits of said pins for stability of said knife holders on said mounting shaft, and said spring means constituting one spring for each said pairs of knife holders and extending in said shaft groove.

4. A flail knife assembly including a mounting shaft having a cross-sectional shape of angularly disposed sides, knife holders having openings with shapes of said angularly disposed sides for snugly receiving said shaft and having peripherally extending portions with pin openings and spring openings therein, pins snugly removably received in said pin openings and having a groove on the end of said pins, knives pivotally mounted on said pins and being positionable to extend radially outwardly from said mounting shaft and having crop-cutting edges on the extending ends of said knives, springs releasably attached to said holders and said pins by being disposed in said pin grooves and said spring openings for releasably securing said pins to said holders and render said knives replaceable upon removal of said pins and for axially locating said knife holders on said mounting shaft, wherein the improvement comprises each of said springs having an intermediate length nested in one of said spring openings of said knife holders and includes two opposite end portions formed to respectively encircle said mounting shaft and nest in said pin groove, said opposite end portions both extending from said intermediate length and between said mounting shaft and respective ones of said pins and around said respective mounting shaft and in said pin groove in opposite directions relative to one axial view of said mounting shaft for increasing spring tension on said pin when said spring is subjected to centrifugal force due to rotation of said assembly.

5. The subject matter of claim 4 wherein said mounting shaft has grooves therearound and said knife holders are disposed in pairs and aligned with each one of said grooves in said mounting shaft, and two of said springs being disposed to encircle said mounting shaft on diametrically opposite sides of each one of said grooves in said mounting shaft.

References Cited

UNITED STATES PATENTS

| | | | |
|---|---|---|---|
| 2,680,337 | 6/1954 | Whipple | 172—45 X |
| 2,859,582 | 11/1958 | Babcock | 56—295 |
| 2,871,644 | 2/1959 | Mott | 56—249 X |
| 2,886,117 | 5/1959 | Benson | 241—194 X |
| 3,222,854 | 12/1965 | Barth | 56—294 |

ROBERT PESHOCK, Primary Examiner

P. A. RAZZANO, Assistant Examiner